United States Patent [19]

Hill

[11] Patent Number: 5,096,297
[45] Date of Patent: Mar. 17, 1992

[54] MULTI-OSCILLATOR RING LASER GYROSCOPE WITH IMPROVED STABILIZATION

[75] Inventor: Roger Hill, Midlothian, Scotland

[73] Assignee: GEC-Ferranti Defence Systems Limited, Midlothian, Scotland

[21] Appl. No.: 660,930

[22] Filed: Feb. 28, 1991

Related U.S. Application Data

[63] Continuation of Ser. No. 473,817, Feb. 2, 1990, abandoned.

[30] Foreign Application Priority Data

Feb. 3, 1989 [GB] United Kingdom ............... 8902382

[51] Int. Cl.⁵ ................................. G01C 19/66
[52] U.S. Cl. ............................ 356/350; 372/94
[58] Field of Search .............. 356/350; 372/94

[56] References Cited

U.S. PATENT DOCUMENTS 3,862,803 1/1975 Yntema et al. ............... 372/94
4,213,705 7/1980 Sanders ......................... 356/350
4,470,701 9/1984 Smith ............................ 356/350
4,652,132 3/1987 Nelson et al. ................. 356/350

Primary Examiner—Samuel Turner
Attorney, Agent, or Firm—Kerkam, Stowell, Kondracki & Clarke

[57] ABSTRACT

The gyroscope had a closed optical path (10) defined by four reflecting surfaces (11, 12, 13, 14). Counter-rotating beams of radiation circulating around the closed path are produced by a gaseous active lasing medium executed over a gain region (15) to produce a discharge in the gas. A reciprocal dispersion element (18) is located in the optical path and a solenoid (23) is wound around part of the gain region to produce a magnetic field over that region. One of the reflecting surfaces (14) is a partially transmitting mirror which passes a small proportion of the radiation incident upon it, and detectors (19, 20) detect radiation in each counter-rotating beams passing through the mirror (14). The alternating current components of the outputs of the detectors are used to control a control circuit (22) so as to control the magnetic field produced by the solenoid (23).

6 Claims, 3 Drawing Sheets

MULTI-OSCILLATOR RING LASER GYROSCOPE WITH IMPROVED STABILIZATION

This application is a continuation of application Ser. No. 07/473,817 filed Feb. 2, 1990, now abandoned.

FIELD OF THE INVENTION

This invention relates to ring laser gyroscopes and in particular to the control of magnetic field strengths in Zeeman effect multi-oscillator gyroscopes.

BACKGROUND OF THE INVENTION

A common form of ring laser gyroscope comprises a solid block of material having appropriate thermal and optical properties in which is formed a triangular optical path comprising three straight passages formed in the block and having a mirror at each apex. The three passages communicate with each other and contain a gaseous active lasing medium which is excited to produce a discharge in the gas. The gas discharge causes laser action which results in a first beam of laser radiation passing around the optical path in a clockwise direction and a second beam of laser radiation of the same frequency passing around the optical path in a counter-clockwise direction. The laser gyroscope responds to rotational forces about an axis perpendicular to the plane of the optical path by an increase in the frequency of one beam and a decrease in the frequency of the other, the sense and magnitude of the frequency difference being a measure of the sense and magnitude of the rotational force.

Ring lasers of this type suffer from a problem known as lock-in, wherein the two beams remain at the same frequency under low values of rotational force. Prevention of lock-in usually involves applying a mechanical oscillatory rotation or "dither" upon which any rotational force is superimposed. This technique suffers from all the usual problems of moving mechanical systems.

In order to avoid having to apply dither a different type of ring laser gyroscope has been developed, known as a multioscillator ring laser. This has a square or rectangular optical path and produces two pairs of counter-rotating beams, the two beams circulating in the same direction having opposite circular polarisation. Thus one pair of beams consists of right-circularly polarised beams, one going clockwise and the other counter-clockwise around the optical path. Similarly the other pair of beams consists of left-circularly polarised beams, one going clockwise and the other counterclockwise around the optical path.

The four beams are the result of including in the optical path a reciprocal dispersion element and a non-reciprocal dispersion element. A reciprocal element, which may be quartz crystal, provides different phase shifts for right and left-circularly polarised beams. The non-reciprocal element provides different phase shifts for light beams travelling through it in opposite directions. The non-reciprocal effect may be produced by a magnetic field acting on the excited gas discharge region of the laser, to produce frequency-splitting by the Zeeman effect. Although the magnetic field may be produced by either a permanent magnet or a solenoid, it is important that the magnetic field strength should be very closely controlled.

It is an object of the invention to provide a multioscillator ring laser gyroscope in which the magnetic field producing Zeeman frequency-splitting may be accurately controlled.

SUMMARY OF THE INVENTION

According to the present invention there is provided a multioscillator ring laser gyroscope which includes a closed optical path defined by at least four reflecting surfaces, means for producing counter-rotating beams of radiation around said closed path and comprising a gaseous active lasing medium and excitation means for exciting said medium over a gain region to produce a discharge in said gas, a reciprocal dispersion element located in said optical path, a solenoid formed around part at least of said gain region and arranged to be supplied with an electric current to produce a magnetic field over said region, a partially transparent mirror making up one of said reflecting surfaces and arranged to transmit part of the radiation in each beam, detector means responsive to the radiation passing through said mirror, and control means responsive to the alternating-current component of the detector output to control the strength of the magnetic field produced by said solenoid.

BRIEF DESCRIPTION OF THE DRAWINGS

The invention will now be described with reference to the accompanying drawings, in which.

DETAILED DESCRIPTION OF THE DRAWINGS

Figure 1:
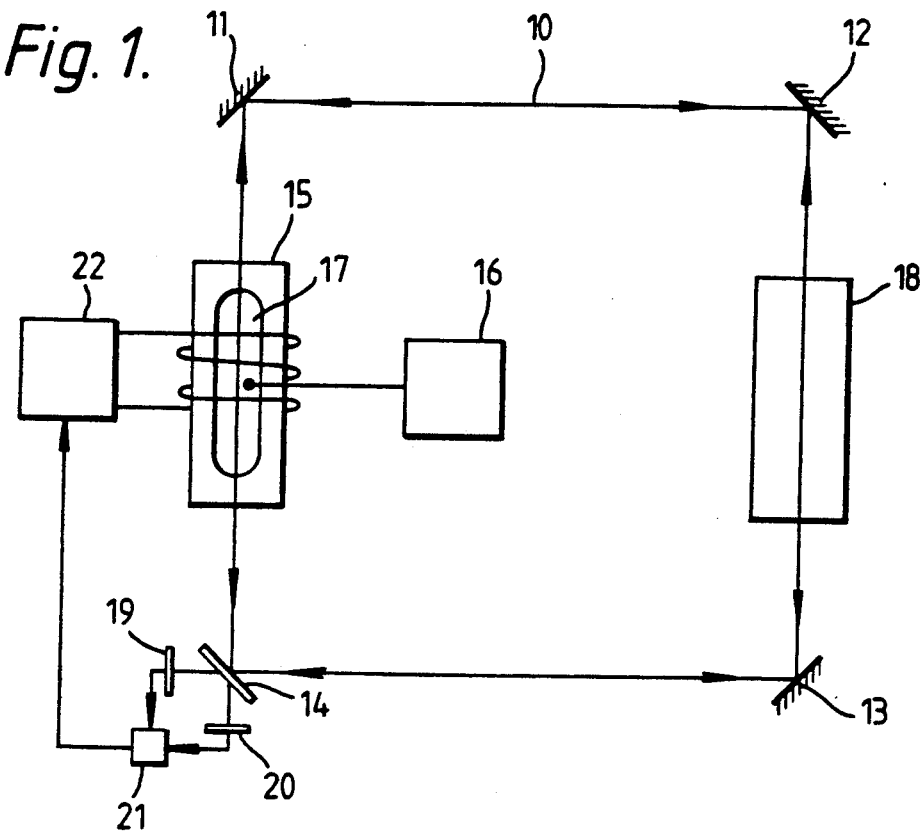
FIG. 1 is a schematic view of one form of multioscillator ring laser gyroscope.

Referring now to FIG. 1, a multioscillator ring laser gyroscope is shown schematically as comprising a closed optical path 10 defined by four reflecting surfaces 11, 12, 13 and 14. In practice the optical path is within a sealed cavity which contains a gaseous laser active medium. The active medium within a gain region 15 is provided with means for producing an electric discharge in the gas, for example by means of radio-frequency energy from a power supply 16 which is coupled to the gas by a pair of transverse electrodes 17 arranged on opposite sides of the cavity. The cavity also contains a reciprocal dispersion element 18 which may be a quartz crystal.

An output from the laser gyroscope is obtained by making one reflecting surface 14 in the form of a partially-transmitting mirror. A small proportion of the radiation incident upon the mirror in the clockwise (CW) and counterclockwise (CCW) beams passes through the mirror onto two detectors 19 and 20. The outputs of the detectors are combined in a combining circuit 21 the output of which is applied to a control circuit 22.

A non-reciprocal element in the optical path is formed by providing a magnetic field over the gain region 15 of the laser gyroscope. The field, which may be of the order of 100 Gauss, is produced by a solenoid 23 wound around the gain region 15 and supplied with current by the control circuit 22.

Figure 2:
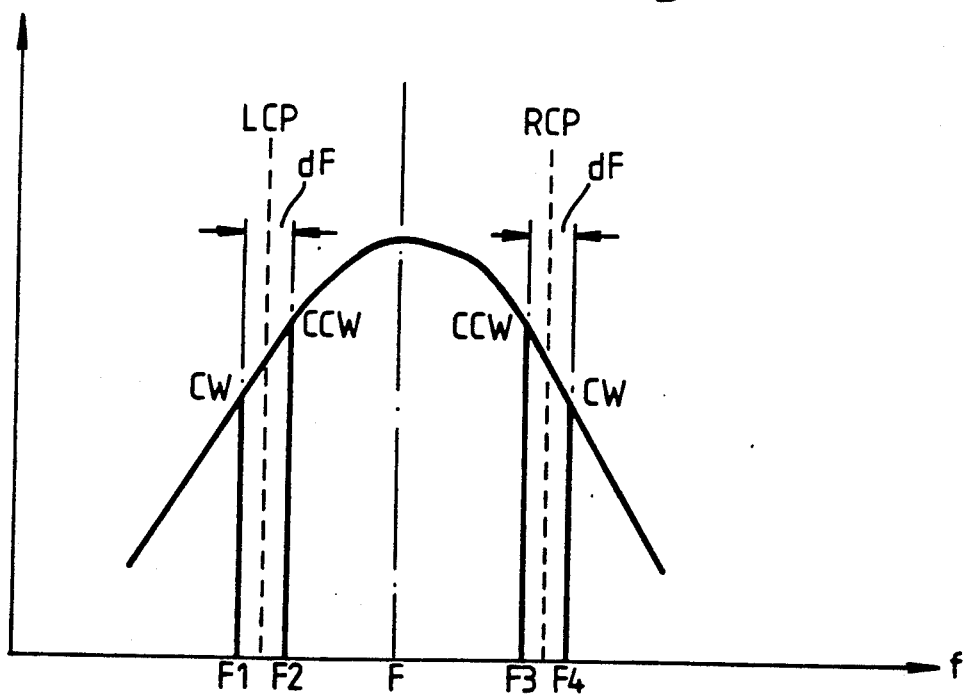
FIG. 2 is a diagram illustrating the splitting of the laser frequency into its four components.

FIG. 2 illustrates how the four resonating modes are produced in the laser cavity. The curve represents the laser output of the laser medium plotted against frequency. The resonant frequency of the laser cavity is shown at F. The effect of the reciprocal dispersion element 18 of FIG. 1 is to produce different frequencies for the left-circularly polarised (LCP) and right-circularly polarised (RCP) modes. The magnetic field around the gain region uses the Zeeman effect to produce further frequency splitting in the LCP and RCP modes depending upon the direction of the radiation around the optical path, producing two clockwise (CW) modes and two counterclockwise (CCW) modes. It will be seen that the frequencies of the two beams travelling in one direction (CCW) are spaced between the frequencies of the two beams travelling in the other direction (CW).

As will be seen from FIG. 2 the frequency splitting $dF$ which occurs due to the magnetic field is given by $$dF = F2 - F1 = F4 - F3$$

and the average frequency splitting is given by $$dF = [(F2 - F1) + (F4 - F3)] - 2$$

The frequencies F1, F2, F3 and F4 are dependent upon the strength of the magnetic field and it is therefore vital that this strength should be maintained at a constant value to a very high degree of accuracy.

Figure 3:
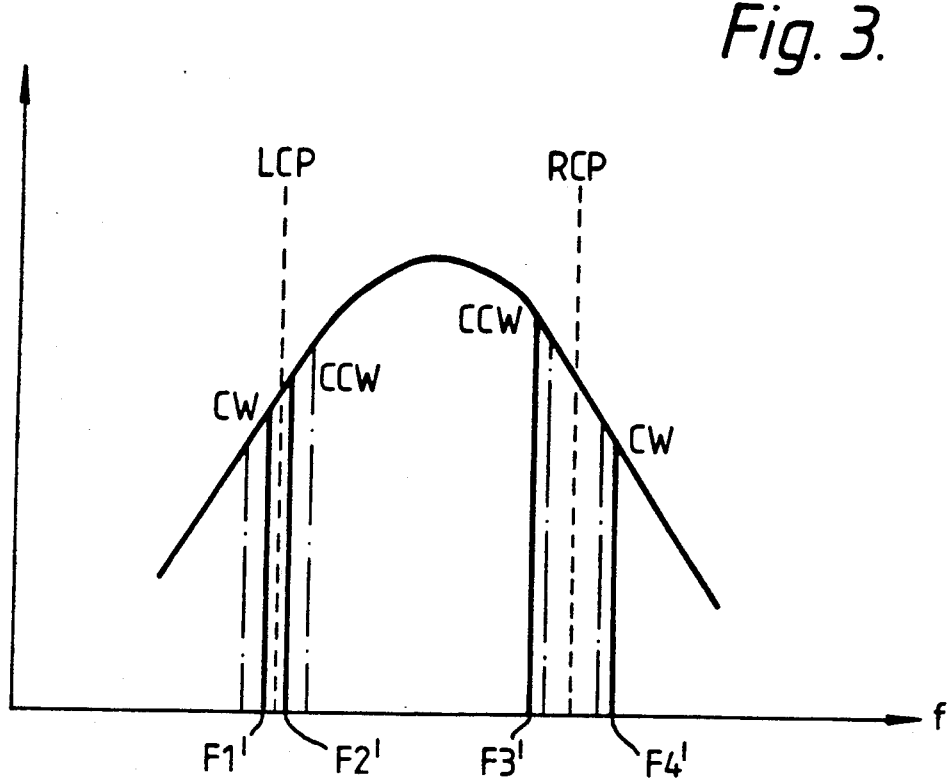
FIG. 3 illustrates the effect of external rotational forces on the frequencies of FIG. 2.

FIG. 3 shows the effect of rotation about an axis passing through the centre of the optical path and perpendicular to the plane of the optical path. If the ring laser is rotated in a counterclockwise direction the effect will be that frequencies F1 and F4 increase in value to F1' and F4' whilst frequencies F2 and F3 decrease by the same amount to F2' and F3'. The opposite effect occurs if the rotation is in a clockwise direction.

If each CCW component is lowered in frequency by an amount $\delta$ whilst each CW component increases by an amount $\delta$, then the average frequency splitting is now given by the expression $$[(F2' - F1') + (F4' - F3')]2$$
$$= ([F_2 - \delta) - (F_1 + \delta)] + \{(F_4 + \delta) - (F_3 - \delta)\})/2$$
$$= [F2 - F1 - + F4 + - F3 +]2$$
$$= (F2 - F1) + (F4 - F3)2$$

This is the same as in the non-rotating case, showing that the average frequency splitting is not affected by the applied rotational forces.

Figure 4:
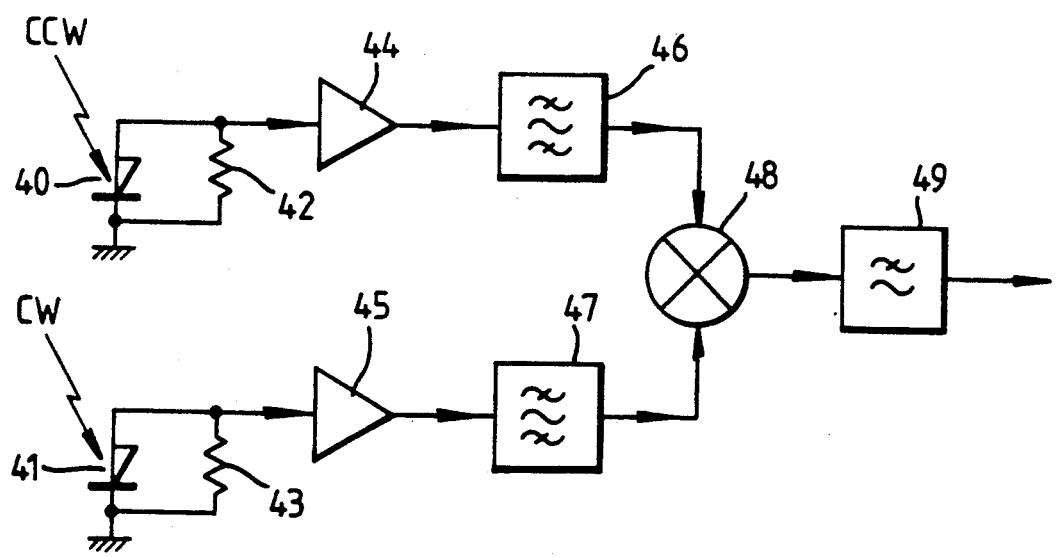
FIG. 4 is a schematic circuit diagram of one form of detector arrangement.

If a detector detects the energy in each component of the CW beam then the output of the detector has a dc component of the CW beam and an ac component at the difference frequency (F4−F1). Similarly a second detector responsive to the components of the CCW beam has an output with an ac component at the difference frequency (F3−F2). Suitable mixing of these two ac components gives a signal at a frequency which is twice the average splitting frequency $dF$ i.e. $(F4-F1)-(F3-F2)=2dF$ A detector and combining arrangement similar to that of FIG. 1 is shown in FIG. 4. Each of the two detector diodes 40 and 41 is shunted by a low resistance 42 and 43 of order of 50 Ω and the signal is amplified by a narrow-band amplifier 44 and 45 at the expected output frequency (F4−F1) or (F3−F2) which may be of the order of 400 MHz. These signals are passed through band-pass filters 46 and 47 before being passed on to a mixer 48 and a low pass filter 49, the latter being arranged to pass the frequency component at twice the splitting frequency. This will normally be below 1 MHz.

Figure 5:
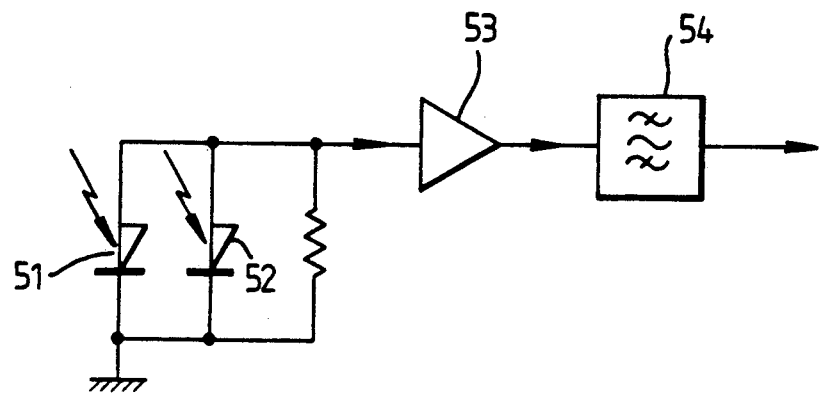
FIG. 5 is a schematic circuit diagram of an alternative form of detector circuit.

An alternative detector and combining arrangement is shown in FIG. 5. In this a single diode is used, or two diodes 51 and 52 bridged by low-inductance connections. Mixing of the frequencies occurs as a result of the interconnection and the amplifier 53 and bandpass filter 54 operate at around 1 MHz.

As has already been stated, the purpose of the arrangement described is to control very accurately the strength of the magnetic field produced in the gain region of the laser gyroscope by the solenoid. The frequency of the output signal from the detector and combiner arrangements of FIGS. 4 and 5 indicates the strength of the field and hence the control circuit must counter variations in this frequency.

Figure 6:
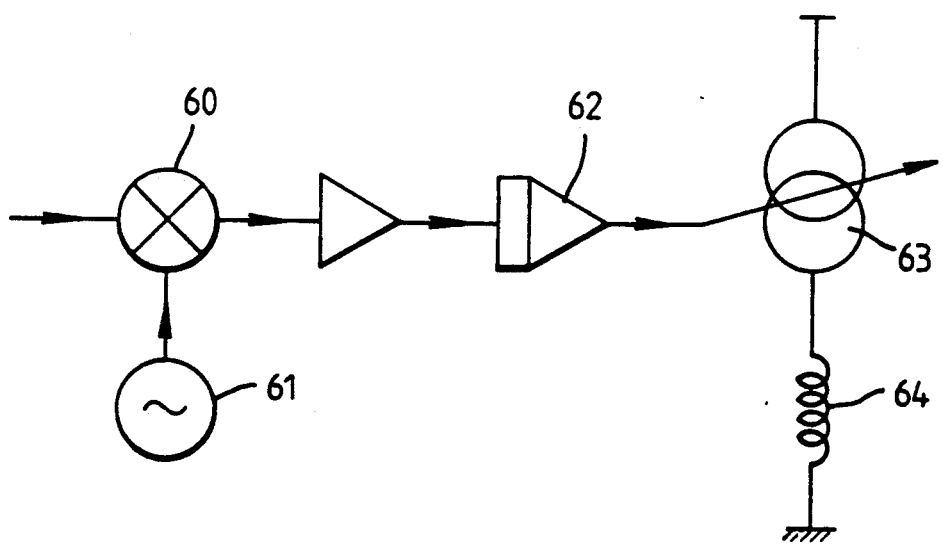
FIG. 6 illustrates one form of control means for use with the detector.

FIG. 6 is a diagram of a suitable control circuit for this purpose. The output signal from the band pass filter of FIG. 5 is mixed by a mixer 60 with a reference frequency generated by a crystal oscillator 61. The resulting dc error signal is amplified and applied to an integrator 62. The output of the integrator is used to control the current applied to the solenoid 64 by a voltage-controlled current source 63.

The detector arrangements described may be used also to provide signals to control other parameters of the laser gyroscope, such as cavity length control and intensity control. These use components of the detector output at different frequencies which may thus be separated from one another by the use of the appropriate filters.

The gas discharge may be excited by a dc power supply in place of the radio-frequency source described above.

I claim:

1. In a multi-oscillator ring laser gyroscope, said gyroscope comprising:

at least four reflecting surfaces defining a closed optical path, at least one of said reflecting surfaces being partially transparent;

a gain region disposed in said path;

an active lasing medium present in said path;

excitation means located at said gain region for causing a discharge in said medium of radiation of frequency F thereby creating counter-rotating beams of the radiation around said path;

reciprocal dispersion means in said path, said reciprocal dispersion means serving to split the frequency of said counter-rotating beams, about said frequency F, in dependence upon a polarisation characteristic of said beams;

non-reciprocal dispersion means in said path, said non-reciprocal dispersion means causing each of said polarisation dependent split frequency beams to be split again in dependence upon the direction or rotation of said beams around said path thereby to produce four identifiable beams of radiation around said path, said identifiable beams being (1) a first beam in the form of a left circularly polarised beam rotating clockwise around said path and having a frequency $F_1$, (2) a second beam in the form of a left circularly polarised beam rotating counterclockwise around said path and having a frequency $F_2$, (3) a third beam in the form of a right circularly polarised beam rotating counterclockwise around said path and having a frequency $F_3$, and (4) a fourth beam in the form of a right circularly polarised beam rotating clockwise around said path and having a frequency $F_4$;

where $F_4 > F_3 > F_2 > F_1$;

and detector means disposed to receive part of said beam of radiation transmitted by said partially transparent at least one of said reflecting surfaces; the improvement wherein said non-reciprocal dispersion means is arranged to produce a magnetic field in said gain region of said path;

said detector means is arranged to provide an output $2dF$ where $2dF = (F_4 - F_1) - (F_3 - F_2)$;

and feedback control means, responsive to the output of the detector means, are arranged to control the magnetic field produced in said gain region by said non-reciprocal dispersion means, to maintain said detector output constant.

2. An improved gyroscope as claimed in claim 1 in which said detector means comprises a first diode responsive to the beams of radiation circulating around said closed path in a first direction and a second diode responsive to the beams of radiation circulating around said closed path in an opposite direction.

3. A gyroscope as claimed in claim 2 which includes a separate band-pass filter to which an output of a respective one of said diodes is applied and a mixer arranged to combine the signals from said band-pass filters to provide a combined output for application to said feedback control means.

4. A gyroscope as claimed in claim 2 in which said first and second diodes are connected in parallel with one another and which includes a band-pass filter through which a combined output of said diodes is passed for application to said feedback control means.

5. A gyroscope as claimed in either of claims 3 or 4 in which said feedback control means includes comparison means for comparing said combined output with a reference signal to derive an error signal and means for controlling energisation of said non-reciprocal dispersion means, to vary said magnetic field, in response to said error signal.

6. A gyroscope as claimed in claim 5 in which said feedback control means includes a voltage-controlled current source to supply energising current to said non-reciprocal dispersion means.

* * * * *